United States Patent [19]

Anderson

[11] Patent Number: 4,507,916
[45] Date of Patent: Apr. 2, 1985

[54] WIND GENERATING MEANS

[76] Inventor: Max F. Anderson, R.R. #1, Stewardson, Ill. 62463

[21] Appl. No.: 598,383

[22] Filed: Apr. 9, 1984

Related U.S. Application Data

[63] Continuation-in-part of Ser. No. 53,828, Jul. 2, 1979, Pat. No. 4,442,887, and a continuation-in-part of Ser. No. 547,479, Oct. 31, 1983.

[51] Int. Cl.$^3$ .................................................. F03G 7/00
[52] U.S. Cl. ...................................... 60/641.1; 60/721
[58] Field of Search ................. 60/641.1, 641.6, 641.2, 60/675, 721

[56] References Cited

U.S. PATENT DOCUMENTS

| | | | |
|---|---|---|---|
| 3,436,908 | 4/1969 | Van Delic | 203/DIG. 1 |
| 4,070,131 | 1/1978 | Yen | 415/3 |
| 4,157,014 | 6/1979 | Clark, Jr. | 60/641.6 X |
| 4,182,124 | 1/1980 | Kraus et al. | 60/721 X |

FOREIGN PATENT DOCUMENTS 72210  6/1981  Japan ................................ 60/641.6

Primary Examiner—Stephen F. Husar
Attorney, Agent, or Firm—Victor R. Beckman

[57] ABSTRACT

A system for obtaining air movement is disclosed which includes a dome which is supported a spaced distance above the earth to provide for the inlet of air from a location outside the dome. A passage or tunnel is provided which has an air inlet beneath the dome in substantially axial alignment with the dome axis and an air outlet outside the dome, with the passage or tunnel outlet below the level of the air inlet thereof. Cooling elements of refrigeration means are located in the passage or tunnel for cooling air therein and producing gravity flow of air down the passage or tunnel from the air inlet to the air outlet of the passage or tunnel. Air enters the passage or tunnel air inlet with a cyclonic motion due to Coriolis acceleration, and wind-operated means are located under the dome for operation by the cyclonically moving air. A generator is located in a chamber beneath the passage or tunnel and is coupled to the wind-operated means under the dome for operation thereby. A plurality of wind-operated means are located in the passage or tunnel for operation by downwardly flowing air in said passage or tunnel.

10 Claims, 4 Drawing Figures

4,507,916

WIND GENERATING MEANS

RELATED APPLICATIONS

This is a continuation-in-part application of copending U.S. Patent Application Ser. No. 53,828, filed July 2, 1979 entitled Apparatus and Method for Harnessing Wave Motion and Solar Energy and Coriolis Acceleration of Nature for Solar Distillation Use, and the Like, now U.S. Pat. No. 4,442,887, and of copending U.S. Patent Application Ser. No. 547,479, filed Oct. 31, 1983 entitled Wind Generating Means.

TECHNICAL FIELD

The present invention is directed to wind generating means for use in obtaining air movement, which air movement may be used to operate vane-driven means which, in turn, may be used to drive an electrical generator, or the like.

BACKGROUND OF THE INVENTION

Air moving systems are known as shown, for example, in U.S. Pat. No. 3,436,908—Van Delic, wherein a solar air moving system for obtaining upward movement of air through an elongated conduit is shown. Wind turbines also are well known as shown, for example, in U.S. Pat. No. 4,070,131—Yen.

SUMMARY OF THE INVENTION AND OBJECTS

An object of this invention is the provision of improved method and means of producing a cyclonic wind of great magnitude for use in driving wind-propelled means, such as propeller generators, and the like.

An object of this invention is the provision of method and means of the above-identified type which relies both upon natural energy forces and upon refrigeration means for producing the cyclonic wind under a wide range of ambient weather conditions.

The above and other objects of this invention are achieved by use of a dome which is supported on the earth. Air inlet means are provided adjacent the bottom of the dome for the admission of outside air thereto. A shaft or tunnel is formed in the earth having an air inlet beneath the dome adjacent the dome axis and having an air outlet outside the dome at a level beneath the level of the air inlet. Cooling elements of a refrigeration system are located in the shaft or tunnel for cooling air contained therein beneath the temperature of ambient air and for unpumped gravity flow of air downwardly through the shaft or tunnel, which air is discharged to the atmosphere through the shaft or tunnel outlet. Ambient air is drawn into the dome through the dome air inlet means and moves with a cyclonic motion beneath the dome due to Coriolis acceleration thereof. Wind-operated means are located beneath the dome for operation by the cyclonic air flow under the dome. The wind operated means may comprise a vertical shaft extending along the dome axis and vanes attached to the shaft which are driven by the cyclonic wind flow. A generator, or the like, is attached to the shaft for utilizing the rotating energy of the shaft.

BRIEF DESCRIPTION OF THE DRAWINGS

In the drawings, wherein like reference characters refer to the same parts in the several views.

Figure 2:
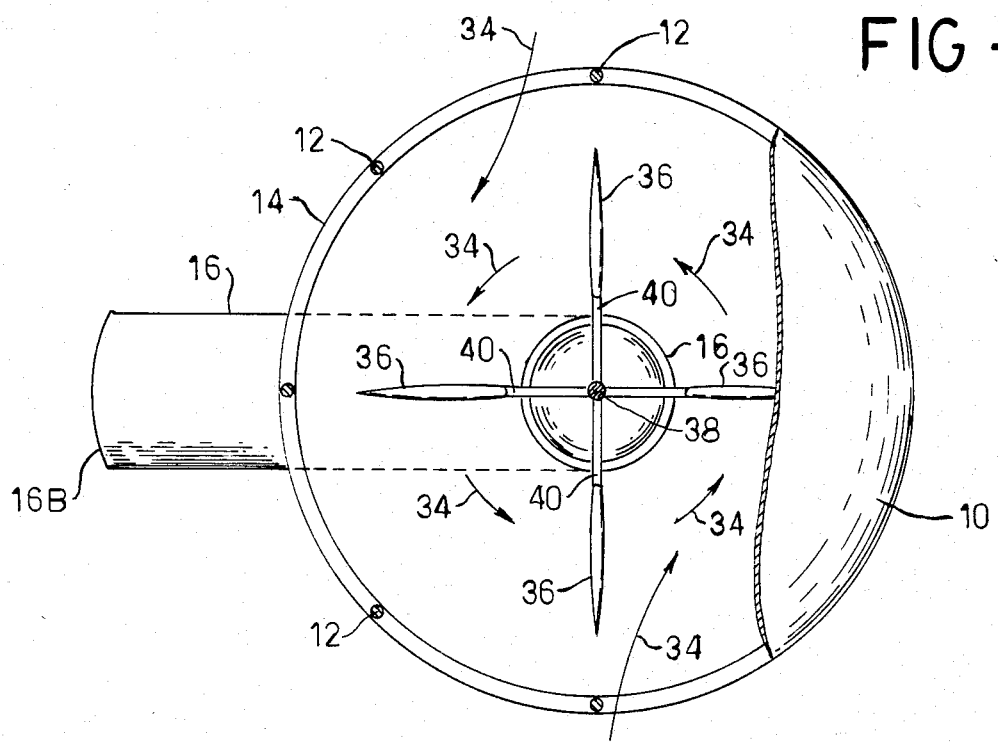
FIG. 2 is a diagrammatic plan view of the system shown in FIG. 1 with a portion of the dome shown broken away for clarity.
Figure 1:
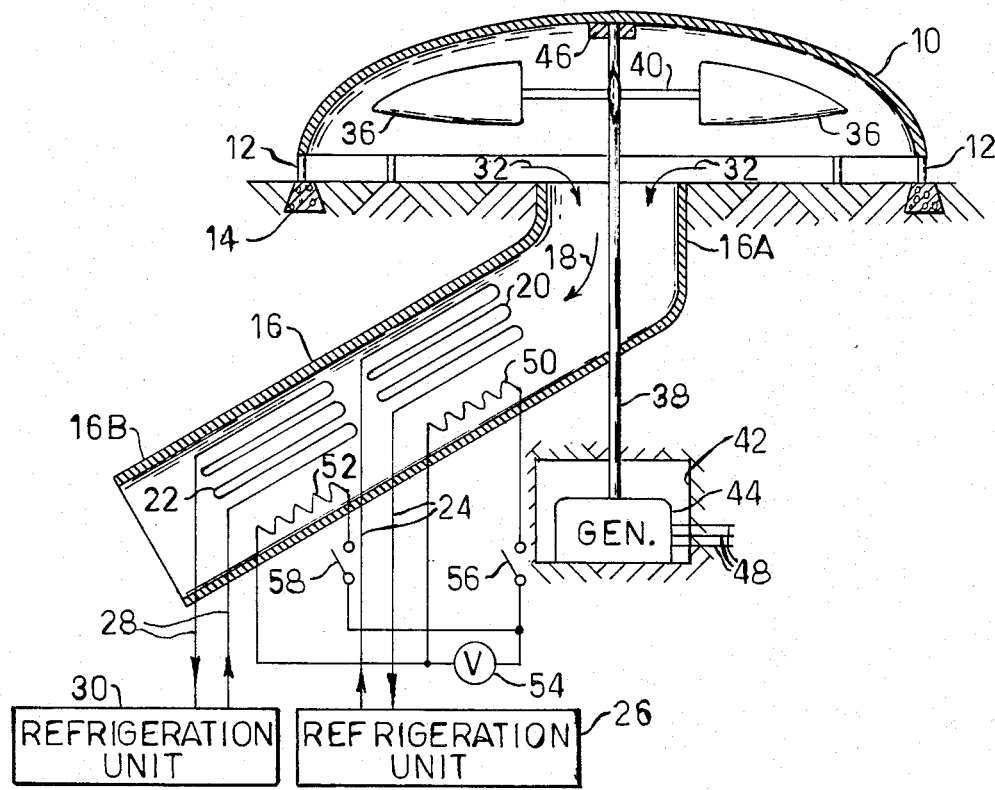
FIG. 1 shows in diagrammatic form a fragmentary side elevational view with parts broken away for clarity of details of a novel wind generating means embodying the present invention.

Reference first is made to FIGS. 1 and 2 wherein the wind generating means of the present invention is shown to comprise a generally hemispherical cover, or dome, 10 which is located above the surface of the earth on supporting posts 12. If desired, a foundation 14 may be provided for solid support of the posts. However, if desired, individual foundation members may be provided for each post in place of the illustrated foundation. In any event, air inlet means for the dome are provided along at least a portion of the periphery thereof as by spacing the lower edge 10A of the dome from the upper face 14A of the foundation, or from the surface of the earth.

A tunnel, passage, or conduit 16 is provided in the earth having an air inlet end 16A under the dome at a central location therewith and an air outlet end 16B at a location outside the dome. In the illustrated arrangement the passage extends generally vertically downwardly adjacent the inlet, and then slants downwardly to the outlet. As will become apparent hereinbelow, the outlet 16B is located at a level beneath that of the inlet 16A for unpumped gravity flow of air through the passage in the direction of arrow 18 from the inlet to the outlet.

In accordance with one feature of this invention, one or more refrigerating elements, or coils, are located in the passage 16 for cooling air flowing therethrough. In FIG. 1, two such cooling elements 20 and 22 are shown wherein element 20 is located upstream from element 22. The upstream coil 20 is shown connected through lines 24,24 to a first refrigerating unit 26, and the downstream coil 22 is shown connected through lines 28,28 to a second refrigerating unit 30. The refrigerating units may be of conventional types which include a motor-compressor for withdrawing vapor refrigerant from the associated cooling element, a condenser for condensing the refrigerant from the compressor, and an expansion valve through which the liquid refrigerant passes from the condenser to the cooling element. The temperature at the cooling elements 20 and 22 is sufficiently low for cooling of air in the passage 16 below ambient temperature. Consequently, the cooled air within the passage 16, being heavier than outside air, flows downwardly through passage 16 and exits therefrom at the lower outlet end 16B. Ambient air is drawn into the system beneath the lower edge 12A of the dome 12, and enters the inlet end 16A of passage 16 as indicated by arrows 32.

As seen in the drawings, and noted above, the air inlet 16A of passage 16 is substantially in alignment with the dome axis. Due to Coriolis acceleration, air traveling away from the equator is deflected eastward, and air traveling toward the equator is deflected westward. As a result, in the Northern hemisphere, the air will rotate in a counterclockwise direction, and in the Southern hemisphere it will rotate clockwise in passing through the vertical, central, portion of the passage 16. In FIG. 2, a Northern hemisphere location is indicated by air rotation counterclockwise in the direction of arrows 34. A cyclonic wind is therefore produced within the dome 10, with a vortex extending along the dome 10 and air inlet 16A axes. The rotating mass of air, as the rotor of a gyroscope, is subject to gyroscopic inertia, precession, and the like.

Energy of the resultant whirling, or cyclonic, wind beneath the dome is harnessed by locating wind-operated means in the path thereof. Any suitable wind-driven means may be employed and, for purposes of illustration, a plurality of blades, or vanes, 36 are shown which are attached to a vertical shaft 38 by arms 40 are shown. The shaft 38, which is coaxially located with the dome axis, extends from the top of the dome, through the inlet portion 16A of passage 16, to a chamber 42 formed in the earth beneath the dome 10 and passage 16. The lower end of the shaft 38 is coupled to a generator 44 in chamber 40 for drive actuation thereof. A bearing 46 attached to the top of the dome 10 supports the upper end of the shaft 38. The blades 36 are driven by the cyclonic motion of the air mass inside the dome thereby rotating the shaft 38 and generator 44 coupled to the shaft. Electrical energy generated by the generator at lines 48 may be used for any desired purpose, not shown.

Water vapor in the air which condenses but does not freeze in passing the cooling elements 20 and 22 flows down the passage 16 and is discharged at the lower end thereof. Water vapor which condenses and freezes on cooling elements 20 and 22 reduces the efficiency of the cooling operation. To facilitate removal of frozen material from the cooling elements, heating elements 50 and 52 may be located adjacent the cooling coils. The refrigerating unit associated with the cooling element to be cleared of ice may be shut down, and the adjacent heating element energized to promote rapid melting of the ice. In FIG. 1, the heating elements 50 and 52 are shown connected to a power source 54 through switches 56 and 58, respectively, for individual, selective, accelerated deicing of the cooling elements 20 and 22, when desired.

In operatioon, the temperature of the cooling coils 20 and 22 is lowered by operation of the refrigeration units 26 and 30 to cool air within the passage 16 to a temperature below ambient air temperature. For example only, and not by way of limitation, the upstream cooling element 20 may operate to lower the air temperature thereat to approximately 0° C. for removal of substantially all of the water vapor therefrom. The downstream cooling element 22 may be operated at a lower temperature for further cooling of the air. Because much of the water vapor is removed from the air in passing cooling element 20, relatively little icing takes place at downstream cooling element 22.

The cooled air within the passage 16, being at a lower temperature than the outside air, flows downwardly by action of gravity through passage 16 and is discharged at the lower, discharge end 16B thereof. Due to Coriolis acceleration, the flowing air rotates in a counterclockwise direction (for a Northern hemisphere location) for production of a cyclonic wind inside the dome 10, having a vortex which extends along the axis of the inlet portion 16A of the passage and axis of the dome. Energy of the resultant whirling, or cyclonic, wind is harnessed by the wind-operated 36 which are rotated by the cyclonic wind to drive the shaft 38 coupled to generator 44. The cooling elements 20 and 22 are deiced, when desired, by shutting down the associated refrigeration unit, and energizing the associated heating element 50 or 52. With the present system, operation in a wide variety of environments, including very cold environments, is possible so long as air in the passage 16 is cooled below the ambient air temperature to provide for the unpumped gravity flow of cooled air downwardly through the passage 16, with the resultant cyclonic wind motion.

It here will be noted that the drawings are not to scale but, primarily, comprise diagrammatic showings which are intended to illustrate the invention. A wide range of sizes is possible in the employment of the invention, including extremely large sizes. For example, the dome 70 may be of a size to cover a surface area on the order of fifty acres to one square mile (0.2 to 2.59 sq. km.) A passage, or tunnel, 16 with a diameter up to about 100 ft. (30.48 meters) may be employed, depending upon the size of the dome. Obviously, the invention is not limited to such dimensions.

Figure 3:
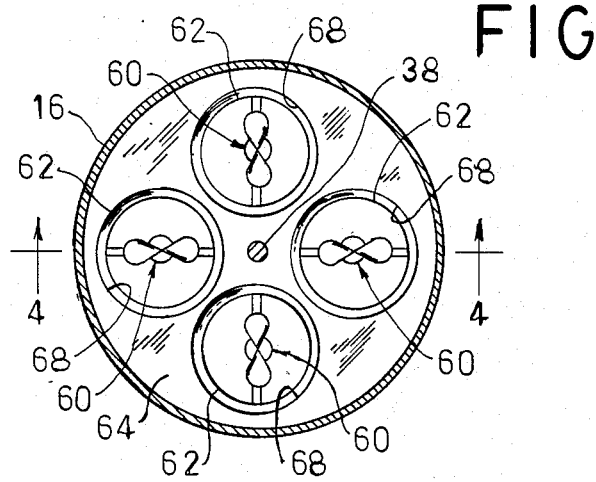
FIG. 3 is an enlarged fragmentary longitudinal sectional view of the inlet portion of the tunnel showing a modified form of this invention which includes wind-driven devices located thereat.
Figure 4:
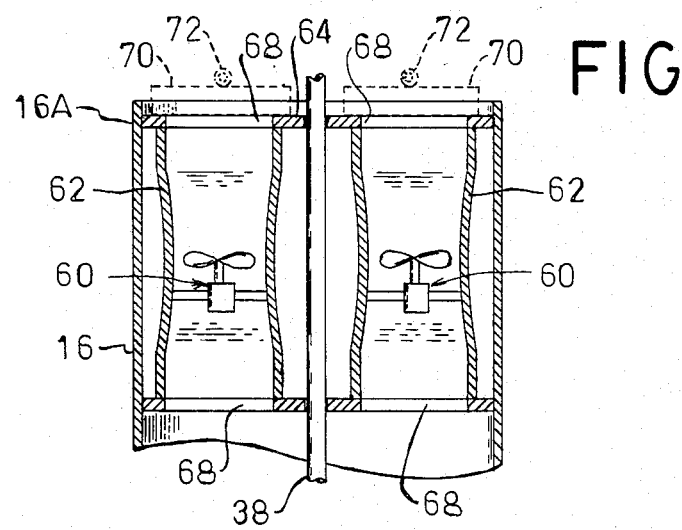
FIG. 4 is a sectional view taken along line 4—4 of FIG. 3.

The invention having been described in detail in accordance with requirements of the Patent Statutes, various changes and modifications will suggest themselves to those skilled in this art. For example, vane driven means may be included in the passage, or tunnel, 16 for operation by air passing downwardly therethrough. Reference now is made to FIGS. 3 and 4 wherein the upper inlet portion 16A of passage 16 is shown to include four (4) vane-driven means 60 thereat, comprising, for example, vane-driven generators 60 at quadrature positions within the passage. The vane-driven generators are shown mounted inside venturi tubes 62 comprising shunt passages for air flowing through the passage or tunnel 16 thereat. The venturi tubes 62 are attached to apertured end plates 64 and 66 which are affixed to the passage 16. The plates are formed with apertures 68 for the venturi tubes, and a central aperture through which the drive shaft 38 extends. The vane-driven means 60 are mounted inside the venturi tube with the vanes thereof at the throat of the venturi tubes. The increased velocity of air through the throat of the venturi tubes provides for an increased speed of rotation of the generator vanes located thereat.

To control the flow of air through the discharge tube, solid covers may be placed over the apertures 68 in the top plate 64 to prevent the flow of air through the associated venturi tube. In FIG. 4, covers 70 are shown in broken line, which covers may be provided with an eye bolt 72 to facilitate attachment of a line thereto for lifting the same when placing them onto, or removing them from the aperatures.

Other changes and modifications include the use of other types of wind-driven means under the dome in place of the vanes 36 and associated structure. For example, an array of wind-driven generators, such as shown in the above-mentioned related patent applications, may be located under the dome, with the blades, or vanes facing in the direction of the cyclonic wind for maximum coupling therewith. Such an arrangement eliminates the need for the underground chamber 42 and generator 44 thereat. In another modification, the generator 44 may be located adjacent the top of the dome, either inside or outside the dome. Also, the generator 44 may be located at some other position, not in axial alignment with the dome, and connected to the shaft 38 through suitable mechanical coupling means. In addition, the dome, or portions thereof, may be formed of light-transmitting material for solar heating of air contained in the dome, if desired. Also, a pond, or, ponds, of water may be included under the dome for solar evaporation. Also, the end of the passage, or tube, 16 may be extended downwardly, and additional wind-propelled generators may be located within the extension for generation of additional energy by the downwardly flowing air. It is intended that the above and other such changes and modifications shall fall within the spirit and scope of the invention as defined in the appended claims.

I claim:

1. In a system for obtaining air movement, the combination comprising,
   a dome,
   means for supporting the dome on the earth,
   air inlet means for providing air from a location outside said system to a location beneath the dome,
   a passage or tunnel in the earth having an air inlet beneath the dome and an air outlet outside the dome at a level beneath the level of the tunnel or passage air inlet, and
   refrigeration means including a cooling element for cooling air in said passage or tunnel and providing for gravity flow of cooled air down the passage or tunnel from the inlet to the outlet thereof.

2. In a system as defined in claim 1 including,
   wind-operated means under the dome for operation by air flowing therebeneath.

3. In a system as defined in claim 2 including,
   a chamber in the earth beneath said dome,
   a generator in said chamber, and
   means for connecting said wind-operated means to said generator for driving the same.

4. In a system as defined in claim 3 wherein said connecting means includes a rotatable shaft extending axially from said dome to said generator, and
   blades attached to said shaft inside the dome for drive actuation by air flow in the dome.

5. In a system as defined in claim 2 wherein
   air enters the passage or tunnel with cyclonic motion due to Coriolis acceleration, said wind-operated means comprising,
   a shaft extending along the dome axis, and blades attached to said shaft adapted for propulsion by the cyclonic air motion.

6. In a system as defined in claim 1 including,
   means adjacent the inlet of said passage or tunnel for dividing the same into a plurality of shunt passages, and
   separate wind-operated means in each of the shunt passages for operation by air flow therethrough.

7. In a system as defined in claim 6 including,
   removable covers for said shunt passages for closing the same and preventing air flow therethrough in the closed cover position.

8. In a system for obtaining air movement, the combination comprising,
   a dome, having a lower edge,
   means for supporting the dome on the earth with at least a portion of the lower edge a spaced distance above the earth to provide an inlet for air to the dome from a location outside thereof,
   air passage means in the earth having an upper end terminating beneath the dome adjacent the center thereof and having a lower end terminating at a location outside the dome,
   at least one refrigeration system having a cooling coil inside said air passage means for cooling air in the passage means and gravity flow of air through the air passage means from the upper end to the lower end thereof, air entering said air passage means with cyclonic motion due to Coriolis acceleration, and
   wind-operated means under the dome in the cyclonically moving air for operation thereby.

9. In a system as defined in claim 8 including,
   a chamber in the earth beneath said dome,
   a generator located in said chamber,
   a vertically-extending shaft connecting said wind-operated means to said generator for drive actuation thereof.

10. In a system as defined in claim 8 including,
    a plate formed with a plurality of apertures covering the upper end of the air passage means, and
    removable covers for said apertures for preventing air flow through the apertures in the cover-closed condition.

* * * * *